US012797975B2

(12) United States Patent
Singh et al.

(10) Patent No.: US 12,797,975 B2
(45) Date of Patent: Nov. 17, 2026

(54) VEINED END MILL TOOL BLANKS

(71) Applicant: Diamond Innovations, Inc., Worthington, OH (US)

(72) Inventors: Anshul Singh, Columbus, OH (US); Dwight Dyer, Kingston, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 286 days.

(21) Appl. No.: 18/707,194

(22) PCT Filed: Dec. 14, 2022

(86) PCT No.: PCT/US2022/081505
§ 371 (c)(1),
(2) Date: May 3, 2024

(87) PCT Pub. No.: WO2023/146713
PCT Pub. Date: Aug. 3, 2023

(65) Prior Publication Data
US 2025/0010383 A1 Jan. 9, 2025

Related U.S. Application Data

(60) Provisional application No. 63/384,458, filed on Nov. 21, 2022, provisional application No. 63/304,045, filed on Jan. 28, 2022.

(51) Int. Cl.
*B23C 5/10* (2006.01)

(52) U.S. Cl.
CPC .................................... *B23C 5/10* (2013.01)

(58) Field of Classification Search
CPC ........................................................ B23C 5/10
See application file for complete search history.

(56) References Cited

U.S. PATENT DOCUMENTS 5,031,484 A * 7/1991 Packer .................... B23P 15/34 407/119
6,814,775 B2 11/2004 Scurlock et al.
8,327,958 B2 12/2012 Truemner et al.
(Continued)

FOREIGN PATENT DOCUMENTS

JP H09239613 A 9/1997
WO 200249801 A1 6/2002

*Primary Examiner* — Nirvana Deonauth
(74) *Attorney, Agent, or Firm* — Ari G. Zytcer

(57) ABSTRACT

Provided is a veined end mill tool blank including a body having at least one cutting edge formed of a veined superabrasive material. An anchoring substrate supports the superabrasive material, the substrate including tungsten carbide (WC). An interface integrally joins the veined superabrasive material with the substrate. For each cutting edge, the tool blank is provided with a slot having a curved surface sintered with the superabrasive material. A locator notch is carved on the veined end mill tool blank relative to the veined superabrasive material as a reference point to aid in locating the superabrasive material on the tool blank. The locator notch engraved on the veined end mill tool blank indicates the location of the superabrasive material on the tool blank, thereby eliminating the need for manually locating coordinates of the superabrasive material during a grinding process by a tool fabricator to achieve a precise grinding.

20 Claims, 4 Drawing Sheets

(56) References Cited

U.S. PATENT DOCUMENTS

| | | | |
|---|---|---|---|
| 8,342,268 | B2 | 1/2013 | Lockstedt et al. |
| 10,232,493 | B2 | 3/2019 | Long et al. |
| 10,252,947 | B2 | 4/2019 | Weinl et al. |
| 10,337,256 | B2 | 7/2019 | Zhang |
| 11,065,863 | B2 | 7/2021 | Prichard et al. |
| 2011/0154954 | A1 | 6/2011 | Singh et al. |
| 2018/0009716 | A1 | 1/2018 | Easley et al. |

* cited by examiner

VEINED END MILL TOOL BLANKS

CROSS-REFERENCE:

This is a National Phase Application filed under 35 U.S.C. 371 as the national stage of PCT/US2022/081505 filed on 14 Dec. 2022, an application claiming the benefit of U.S. application Ser. No. 63/304,045 filed on Jan. 28, 2022 and U.S. application Ser. No. 63/384,458 filed on Nov. 21, 2022, the entire contents, of which, are hereby incorporated by reference in their entirety.

FIELD OF THE DISCLOSURE

The present disclosure relates to veined end mill tool blanks composed of superabrasive materials.

BACKGROUND

Veined end mill tool blanks are generally manufactured incorporating a superabrasive material. They are typically compacted and sintered to an anchoring substrate phase (e.g. generally tungsten carbide WC) by an interface supporting the veined superabrasive material. Veined end mill tool blanks composed of a sintered superabrasive material have advantageously emerged as suitable ultrahard superabrasive tools that can be used in metalworking, drilling, reaming, milling, grinding mining and woodworking industries by way of their unique mechanical and physical properties.

The superabrasive materials tend to exhibit a robust abrasive resistance, high toughness and hardness, as would be highly desired by a tool fabricator. Notwithstanding these attractive mechanical and physical features, the root cause of one main barrier known to prevent tools manufactured from superabrasive material from penetrating the market against conventional tool materials like steel or carbide has been in part the manufacturing costs.

Still in this regard, the high costs of these tools restrict them to be used generally in situations, where cutting conditions can be closely monitored and controlled during processing (i.e. grinding) by computer machines. These provide a high accuracy, fidelity and assistance to avoid undesirable impacts, vibrations, or otherwise unwanted removal by error of the veined superabrasive material from the tool blanks.

Of note, veined end mill tool blanks can be manufactured by substantially two different ways. In the first option, the superabrasive material can be brazed onto the WC body and can subsequently be concluded by finishing via a grinding process to produce a tool. In such a scenario, the anchoring substrate WC body would have ground pockets, into which, the superabrasive material would be brazed.

In the second option, slots (e.g. also interchangeably referred to as veins or channels in the art of veined end mill tool blanks) in the WC cylinders may be filled with for example diamond powder, and subsequently sintered, in order to form the veined PCD (i.e, integrally bonded in a high pressure high temperature, HPHT process).

Concerning the second option (integral PCD in the WC blank), the veined end mill tool blank is ultimately ground by a tool fabricator in the production of the tool to expose the PCD cutting edges. Consequently, this inherently requires a tool fabricator to manually align the veined PCD and locate the exact coordinates of the PCD in a grinder. This especially holds true to be able to grind the tool blank accurately without unknowingly by mistake cutting off a part(s) of the PCD from the veined end mill tool blank during a grinding process. Due to the very nature of the foregoing being a rather cumbersome and time-consuming operation, improved options are therefore sought to achieve a desired accurate grinding by a tool fabricator.

Thus, with the above in mind, this disclosure now provides novel solutions over the mentioned shortcomings and limitations by specifically having a locator notch carved or engraved on the veined end mill tool blank in a relative location to the veined superabrasive material.

This enables the locator notch to become a point of reference to locate the superabrasive material on the veined end mill tool blank, thereby eliminating the need for conducting manual measurements. As a result, an advantageous improvement is thereby obtained, such that the superabrasive material is not unintentionally sliced off the veined end mill tool blank by a tool fabricator in a grinding procedure conducted during the finishing stages of fabricating the tool.

SUMMARY

According to an aspect of the disclosure, provided is a veined end mill tool blank, the veined end mill tool blank including a body having at least one cutting edge formed of a veined superabrasive material. A substrate supports the veined superabrasive material, which includes hard metal carbides, predominantly tungsten carbide (WC). An interface integrally joins the veined superabrasive material with the substrate. For each cutting edge, the veined end mill tool blank is provided with a respective slot having a curved surface sintered with the veined superabrasive material. A locator notch is carved on the veined end mill tool blank in a relative position to the veined superabrasive material as a reference point to aid in locating the superabrasive material on the tool blank. The veined end mill tool blank may have a plurality of slots, for example from 3 to 6 slots. The locator notch carved on the veined end mill tool blank indicates the location of the superabrasive material on the tool blank, thereby eliminating the need for manually locating coordinates of the superabrasive material in a grinder by a tool fabricator to achieve precise grinding. The locator notch may either be u-shaped, v-shaped or a straight notch. The superabrasive material may be at least one of polycrystalline diamond (PCD), polycrystalline cubic boron nitride (PcBN), cubic boron nitride (cBN), or any combinations thereof. In some examples, the superabrasive material is polycrystalline diamond (PCD). The locator notch may be a laser carved, an electrical discharge machining (EDM) notch, or the locator notch may be carved by a grinding wheel. The veined end mill tool blank may have a substantially cylindrical shape. The locator notch may be carved on a side of the veined end mill tool blank or on a top of the veined end mill tool blank. The veined end mill tool blank may have a length ranging from 10 mm to 100 mm, or from 10 mm to 50 mm, a vein length ranging from 3 mm to 35, or from 10 mm to 20 mm, and a diameter ranging from 5 mm to 15 mm, or from 10 mm to 15 mm. The veined end mill tool blank may have a helix shaped vein composed of the superabrasive material, where an angle of the helix shaped vein is about 15°, or about 30°.

Other systems, features and advantages will be, or will become, apparent to one with skill in the art upon examination of the following figures and detailed description. It is intended that all such additional systems, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, which are included to provide a further understanding of the subject matter and are incorporated in and constitute a part of this specification, illustrate implementations of the subject matter and together with the description serve to explain the principles of the disclosure.

DETAILED DESCRIPTION

Figure 1A:
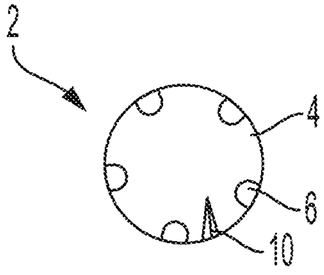
FIG. 1A shows a top view of the veined end mill tool blank in accordance with an exemplary embodiment of the disclosure.
Figure 1B:
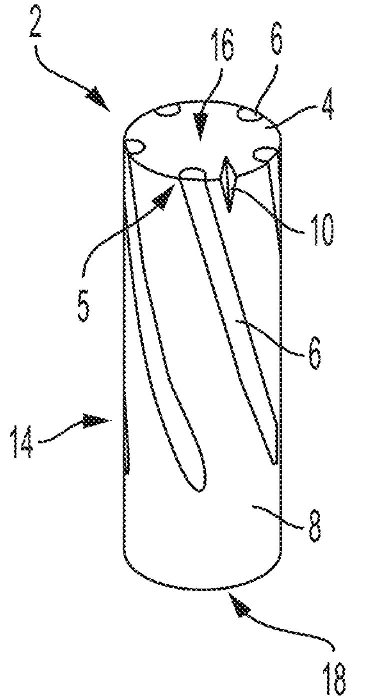
FIG. 1B shows a top perspective view of the veined end mill tool blank in accordance with an exemplary embodiment of the disclosure.
Figure 1C:
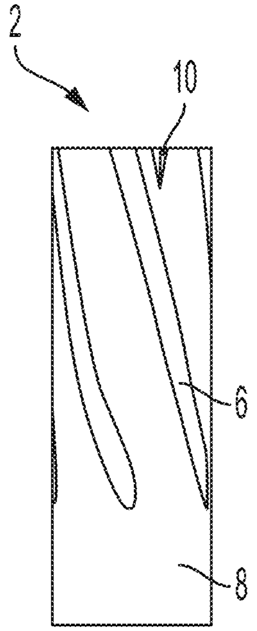
FIG. 1C shows a side view of the veined end mill tool blank in accordance with an exemplary embodiment of the disclosure.

Unless defined otherwise all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

The following definitions set forth the parameters of the described subject matter.

As used herein this disclosure, "wt. %" refers to a given weight percent of the total weight of the veined end mill tool blank unless specifically indicated otherwise.

As used herein this disclosure, the term "D50" refers to a particle size corresponding to 50% of the volume of the sampled particles being smaller than and 50% of the volume of the sampled particles being greater than the recited D50 value. Similarly, the term "D90" refers to a particle size corresponding to 90% of the volume of the sampled particles being smaller than and 10% of the volume of the sampled particles being greater than the recited D90 value. The term "D10" refers to a particle size corresponding to 10% of the volume of the sampled particles being smaller than and 90% of the volume of the sampled particles being greater than the recited D10 value. A width of the particle size distribution can be calculated by determining the span, which is defined by the equation (D90−D10)/D50. The span gives an indication of how far the 10 percent and the 90 percent points are apart normalized with the midpoint.

To determine mean particle sizes from a given particle size distribution, a skilled artisan would be readily familiar with the ISO 4499-2:2008 standard. The ISO 4499-2:2008 standard provides guidelines for the measurement of hardmetal grain size by metallographic techniques using optical or electron microscopy. It is intended for sintered WC/Co hardmetals containing primarily WC as the hard phase. It is also intended for measuring the grain size and distribution by a linear-intercept technique.

To further supplement the ISO 4499-2:2008 standard, a skilled artisan would equally know about the ASTM B390-92 (2006) standard. This standard is used for visual comparison and classification of the apparent grain size and distribution of cemented tungsten carbides that typically contain cobalt as a metallic binder in the binder phase.

As used herein this disclosure, the terms "veined end mill tool blank" or simply "tool blank" are used interchangeably and are intended to refer to the same subject matter in the disclosure as well as in the appended claims.

As used herein this disclosure, the term "length" refers to the longitudinal length of the veined end mill tool blank from the lowest starting point of the bottom surface to the highest end point of the top surface along the entire body of the tool blank. In the same manner, the term "vein length" refers to the longitudinal length of the veined superabrasive material from the lowest starting point to the highest end point.

As used herein this disclosure, the term "cylinder" or "cylindrical" refers to a solid geometric figure with straight parallel sides having a circular or oval cross section.

As used herein this disclosure, the term "helix" refers to a shape of a corkscrew or a spiral staircase. A "helix" displays a three-dimensional shape, much like that of a wire wound uniformly in a single layer around a cylinder or a cone structure as in a corkscrew or spiral staircase.

As used herein this disclosure, the term "about" is meant to mean plus or minus 5% of the numerical value of the number with which it is being used in the claims and herein this disclosure. Thus, "about" may be used to provide flexibility to a numerical range endpoint, in which, a given value may be "above" or "below" the given value. As such, for example a value of 50% may be intended to encompass a range, which may be defined by for example ranges like 47.5%-52.25%, 47.5%-52.5%, 47.75%-50%, 50%-52.5%, 48%-48.5%, 48%-48.75%, 48%-49%, 48%-49.5%, 48%-49.75%, 48%-50%, 48%-50.25%, 48%-50.5%, 48%-50.75%, 48%-51%, 48%-51.5%, 48%-51.75%, 48%-52%, 48%-52.25%, 48%-52.5%, 48.25%-48.5%, 48.25%-48.75%, 48.25%-49%, 48.25%-49.5%, 48.25%-49.75%, 48.25%-50%, 48.25%-50.25%, 48.25%-50.5%, 48.25%-50.75%, 48.25%-51%, 48.25%-51.25%, 48.25%-51.5%, 48.25%-51.75%, 48.25%-52%, 48.25%-52.25%, 48.25%-52.5%, 48.5%-48.75%, 48.5%-49%, 48.5%-49.5%, 48.5%-49.75%, 48.5%-50%, 48.5%-50.25%, 48.5%-50.5%, 48.5%-50.75%, 48.5%-51%, 48.5%-51.25%, 48.5%-51.5%, 48.5%-51.75%, 48.5%-52%, 48.5%-52.25%, 48.5%-52.5%, 49%-49.25%, 49%-49.5%, 49%-49.75%, 49%-50%, 49%-50.25%, 49%-50.5%, 49%-50.75%, 49%-51%, 49%-51.25%, 49%-51.5%, 49%-51.75%, 49%-52%, 49%-52.25%, 49%-52.5% 49.5%-49.75%, 49.5%-50%, 49.5%-50.25%, 49.5%-50.5%, 49.5%-50.75%, 49.5%-51%, 49.5%-51.5%, 49.5%-51.75%, 49.5%-52%, 49.5%-52.25%, 49.5%-52.5%, 49.75%-50%, 49.75%-50.25%, 49.75%-50.5%, 49.75%-50.75%, 49.75%-51%, 49.75%-51.25%, 49.75%-51.5%, 49.75%-51.75%, 49.75%-52%, 49.75%-52.25%, 49.75%-52.5%, 50%-50.25%, 50%-50.5%, 50%-50.75%, 50%-51%, 50%-51.25%, 50%-51.5%, 50%-52%, 50%-52.25%, 50%-52.5% etc. As used herein this disclosure, the term "predominantly" is meant to encompass at least 95% of a given entity.

As used herein, the term "substantially" refers to the complete or nearly complete extent or degree of an action, characteristic, property, state, structure, item, or result.

As used herein this disclosure, the term "superabrasive ultrahard material", or simply "superabrasive material" refers to a material as found in the following but not limited to crystal diamond, polycrystalline diamond (PCD), thermally stable polycrystalline diamond, chemical vapor deposition (CVD) diamond, metal matrix diamond composites, ceramic matrix diamond composites, nanodiamond, cubic boron nitride (cBN), polycrystalline cubic boron nitride (PcBN), or any combinations thereof.

As used herein this disclosure, "chemical vapor deposition (CVD)" refers to a method, where the veined end mill tool blank is exposed to one or more volatile precursors, which react and/or decompose on the tool blank surface to ultimately produce the desired deposit. Frequently, volatile by-products are also produced, which are removed by gas flow through a reaction chamber.

As used herein this disclosure, the terms "vein", "slot" and "channel" are used interchangeably and are intended to refer to the same subject matter.

As used herein this disclosure, the term "locator notch" is a mark that is carved, engraved, embedded or otherwise inscribed on the tool blank indicating the accurate location of the superabrasive material on the tool blank in a relative position to the locator notch mark. Consequently, this eliminates the need for manually locating coordinates of the superabrasive material during a grinding process by a tool fabricator during the finishing stages in the production of a tool to achieve a precise grinding.

Wherever used throughout the disclosure, the term "generally" has the meaning of "approximately", "typically" or "closely" or "within the vicinity or range of".

Now generally referring to the drawings, in which, like numerals represent like components throughout the several views, the examples and embodiments of the present disclosure are next described.

Turning first to FIGS. 1A-4A a top view, and to FIGS. 1B-4B and 1D-4D a top perspective view of the veined end mill tool blank 2 are respectively depicted in accordance with an example of the disclosure. The veined end mill tool blank 2 is characterized as having a body 8, a top surface 16, a bottom surface 18 and a side 14. The body 8 runs from the lowest starting point of the bottom surface 18 to the highest end point of the top surface 16. The veined end mill tool blank 2 has a substantially cylindrical shape as best observed in FIGS. 1B-4B.

The veined end mill tool blank 2 may customarily have a length generally ranging from 10 mm to 100 mm. In some examples, the veined end mill tool blank 2 may have a length ranging from 20 mm to 100 mm. In other examples, the veined end mill tool blank 2 may have a length ranging from 30 mm to 100 mm. In yet other examples, the veined end mill tool blank 2 may have a length ranging from 40 mm to 100 mm. In still other examples, the veined end mill tool blank 2 may have a length ranging from 50 mm to 100 mm. In further particular examples, the veined end mill tool blank 2 may have a length ranging from 10 mm to 50 mm, 60 mm to 100 mm, from 70 mm to 100 mm, from 60 mm to 80 mm, from 60 mm to 90 mm, from 80 mm to 100 mm, or from 90 mm to 100 mm. As best portrayed in FIGS. 1B-4B, the veined end mill tool blank 2 may have at least one cutting edge 5 formed of a superabrasive material 6, which may typically be a veined polycrystalline diamond (PCD), a veined polycrystalline cubic boron nitride (PcBN), or a veined cubic boron nitride (cBN), or any combinations thereof. In some particular examples, the superabrasive material 6 is composed of veined polycrystalline diamond (PCD).

The veined end mill tool blank 2 typically features a helix shaped (e.g. typically about 15 degrees, or about 30 degrees) vein formed of a superabrasive material 6 and containing a (i) vein length generally ranging from 3 mm to 35 mm, from 6 mm to 35 mm, from 9 mm to 35 mm, from 12 mm to 35 mm, from 15 mm to 35 mm, from 3 mm to 15 mm, from 18 mm to 35 mm, 10 mm to 20 mm, from 21 mm to 35 mm, from 24 mm to 35 mm, from 27 mm to 35 mm, from 18 mm to 27 mm, from 30 mm to 35 mm, or from 33 mm to 35 mm, and a (ii) diameter typically ranging from 5 mm to 15 mm, from 6 mm to 15 mm, from 7 mm to 15 mm, from 8 mm to 15 mm, from 9 mm to 15 mm, from 5 mm to 9 mm, from 10 mm to 15 mm, from 11 mm to 15 mm, from 12 mm to 15 mm, from 13 mm to 15 mm, or from 14 mm to 15 mm.

As best demonstrated in FIGS. 1B-4B for each cutting edge 5, the veined end mill tool blank 2 is provided with a respective slot exhibiting a curved surface characterized by running along the body 8, which is sintered with the superabrasive material 6, like for example diamond powder to ultimately form the veined PCD, in such an instance when diamond is used as the superabrasive material 6.

In some examples, the veined end mill tool blank 2 may have 3 slots. In other examples, the veined end mill tool blank 2 may have 4 slots. In still other examples, the veined end mill tool blank 2 may have 5 slots. In yet other examples, the veined end mill tool blank 2 may have 6 slots. In practice, the veined end mill tool blank 2 may include as many slots or channels as desired, which is not inconsistent and incompatible with the principles of the present disclosure.

A skilled artisan would in practice readily know how sintering is commonly performed and practiced. Thus, the reader is directed to for example US Patent document U.S. Pat. Nos. 6,814,775B2, 8,327,958B2, 8,342,268B2, 10,232,493B2; 10,252,947B2, 10,337,256B2; 10,753,158B2, 11,065,863B2, and US Application Publication document No. 2018/0009716 A1 to further gain insight into sintering procedures and methodologies, all of which documents, are incorporated herein by reference in their entirety.

The veined superabrasive material 6 can practically be composed of any superabrasive material 6 that fulfills the main criteria of imparting a robust abrasive resistance, high toughness and hardness characteristics to the veined end mill tool blank 2. Thus, exemplary ultrahard superabrasive materials may advantageously be chosen from the following, but not limited to, polycrystalline diamond (PCD), polycrystalline cubic boron nitride (PcBN), single crystal diamond, thermally stable polycrystalline diamond, CVD diamond, metal matrix diamond composites, ceramic matrix diamond composites, nanodiamond, cubic boron nitride (cBN), or any desired combinations of superabrasive materials 6, or other superabrasive materials 6, typically employed in conventional superabrasive cutting tools.

As illustrated in FIGS. 1A-4A and 1B-4B, a substrate 4 may provide an anchoring physical support functionality to the superabrasive material 6 of the veined end mill tool blank 2. As best depicted in FIGS. 1D-4D, the substrate 4 may be formed by a transition of the superabrasive material 6 via an interface region 12. The substrate 4 may be composed of hard metals generally of carbides, borides, nitrides and/or carbonitrides, however most typically of tungsten carbide (WC). In certain examples, the substrate 4 may be composed of carbides, borides, nitrides and/or carbonitrides of one or more metals selected from Groups IVB, VB and VIB of the periodic table or any desired combinations thereof. In certain particular examples, the substrate 4 may be composed of at least one of tungsten carbide, tantalum carbide, niobium carbide, vanadium carbide, chromium carbide, zirconium carbide, hafnium carbide, titanium carbide, niobium carbide, or any desired combinations thereof.

The substrate 4 can be present in the veined end mill tool blank 2 in any amount that is not inconsistent and incompatible with the objectives of the present disclosure. The substrate 4 may typically be present in an amount of 1 wt. %-70 wt. % of the total weight of the veined end mill tool blank 2 with a balance of the superabrasive material 6, such as, for example 10 wt. %-70 wt. %, 15 wt. %-70 wt. %, 20 wt. %-70 wt. %, 10 wt. %-20 wt. %, 25 wt. %-70 wt. %, 30 wt. %-70 wt. %, 35 wt. %-70 wt. %, 25 wt. %-35 wt. %, 40 wt. %-70 wt. %, 45 wt. %-70 wt. %, 50 wt. %-70 wt. %, 25 wt. %-50 wt. %, 55 wt. %-70 wt. %, 60 wt. %-70 wt. %, 65 wt. %-70 wt. %, 55 wt. %-65 wt. %, or 67 wt. %-70 wt. % of the total weight of the veined end mill tool blank 2 with a balance of the superabrasive material 6.

The substrate 4 may further include at least one or more metallic binders, as well as grain growth inhibitors typically known to one of ordinary skilled in the art in the likes of, but not limited to, vanadium carbide (VC), chromium carbide ($Cr_3C_2$), tantalum carbide (TaC), titanium carbide (TiC), zirconium carbide (ZrC) and niobium carbide (NbC).

The metallic binders can ideally include one or more transition metals of Group VIIIB of the periodic table. In certain embodiments, the metallic binder may be cobalt. In certain particular embodiments, the metallic binder may equally be a cobalt-based alloy. A cobalt-based metallic alloy binder, in some particular embodiments, may include a cobalt-transition metal alloy. For example, transition metals of the cobalt-based metallic alloy binder can appropriately be selected from the group consisting of molybdenum, ruthenium, rhenium, rhodium, platinum, palladium, manganese, copper, iron, nickel, or any combinations thereof. In other examples, the cobalt-based metallic alloy binder may further include metalloids like silicon and/or can include aluminum.

The metallic binder can be present in the substrate 4 in any amount that is not inconsistent and incompatible with the objectives and principles of the present subject matter. The metallic binder may generally be present in the substrate 4 in an amount of 1 wt. % to 30 wt. % of the total weight of the veined end mill tool blank 2 with a balance of the superabrasive material 6. In some examples, the metallic binder may be present in the substrate 4 in an amount of 1 wt. % to 3 wt. % of the total weight of the veined end mill tool blank 2 with a balance of the superabrasive material 6. In other examples, the metallic binder can be present in the substrate 4 in an amount of 1 wt. % to 5 wt. % of the total weight of the veined end mill tool blank 2 with a balance of the superabrasive material 6. In yet other examples, the metallic binder may be present in the substrate 4 in an amount of 1 wt. % to 7 wt. % of the total weight of the veined end mill tool blank 2 with a balance of the superabrasive material 6. In still other examples, the metallic binder may be present in the substrate 4 in an amount of 1 wt. % to 10 wt. % of the total weight of the veined end mill tool blank 2 with a balance of the superabrasive material 6. In further other examples, the metallic binder may be present in the substrate 4 in an amount of 1 wt. % to 15 wt. % of the total weight of the veined end mill tool blank 2 with a balance of the superabrasive material 6. In even other examples, the metallic binder may be present in the substrate 4 in an amount of 1 wt. % to 20 wt. % of the total weight of the veined end mill tool blank 2 with a balance of the superabrasive material 6. In still other embodiments, the metallic binder may be present in the substrate 4 in an amount of 1 wt. % to 25 wt. % of the total weight of the veined end mill tool blank 2 with a balance of the superabrasive material 6. In even other embodiments, the metallic binder may be present in the substrate 4 in an amount of 1 wt. % to 27 wt. % of the total weight of the veined end mill tool blank 2 with a balance of the superabrasive material 6.

In certain particular embodiments, the metallic binder and the grain growth inhibitor may be present in the substrate 4 in an amount of 1 wt. % to 2 wt. %, 2 wt. % to 5 wt. %, 5 wt. % to 7 wt. %, 3 wt. % to 7 wt. %, or 7 wt. % to 10 wt. % of the total weight of the veined end mill tool blank 2 with a balance of the superabrasive material 6.

For example, when the veined end mill tool blank 2 is formed of sintered PCD in the veins or slots of the tool blank 2, the PCD average grain size may generally range from 0.5 μm to 30 μm. In some examples, the PCD average grain size may range from 1 μm to 5 μm. In other examples, the PCD average grain size may range from 1 μm to 10 μm. In still other examples, the PCD average grain size may range from 1 μm to 15 μm. In yet other examples, the PCD average grain size may range from 1 μm to 20 μm. In further examples, the PCD average grain size may range from 1 μm to 25 μm. In certain embodiments, the PCD average grain size may range from 1 μm to 30 μm. In certain particular embodiments, the PCD average grain size may range from 5 μm to 10 μm, from 10 μm to 15 μm, from 5 μm to 15 μm, from 15 μm to 20 μm, from 5 μm to 20 μm, from 20 μm to 25 μm, from 5 μm to 25 μm, from 25 μm to 30 μm, or from 5 μm to 30 μm.

For determining a particle size, one having ordinary skill in the art may typically employ either dynamic digital image analysis (DIA), static laser light scattering (SLS) also known as laser diffraction, or visual measurement by electron microscopy, a technique known as image analysis and light obscuration. Each method covers a characteristic size range within which measurement is possible. These ranges partly overlap. However, the results for measuring the same sample may vary all depending on the particular method that is used. A skilled artisan who wants to determine particle sizes or particle size distributions would readily know how each mentioned method is commonly performed and practiced. Thus, the reader is directed to for example, (i) "Comparison of Methods. Dynamic Digital Image Analysis, Laser Diffraction, Sieve Analysis", Retsch Technology and (ii) the scientific publication by Kelly et al., "Graphical comparison of image analysis and laser diffraction particle size analysis data obtained from the measurements of nonspherical particle systems", AAPS PharmSciTech. 2006 Aug. 18; Vol. 7(3):69, to further gain insight into each procedure and methodology, all of which are incorporated herein by reference in their entirety.

The current disclosure stems from the premise of providing mitigating solutions against unintentional removal of the superabrasive material 6 by carving, inscribing, or otherwise engraving a locator notch 10 on the veined end mill tool blank 2 in a proximate position to the veined superabrasive material 6, or directly abutting the veined superabrasive material 6. In effect, the locator notch 10 thereby becomes a reference point to aid in locating the superabrasive material 6 on the veined end mill tool blank 2. As a result, a tool fabricator will not have to manually align the superabrasive material 6, and nor will the tool fabricator have to locate the exact coordinates of the superabrasive material 6 during a grinding process in the finishing stages in production of a tool. In consequence, this advantageously allows the tool fabricator to accurately perform the grinding procedure without unknowingly cutting off a part(s) of the superabrasive material 6 from the veined end mill tool blank 2 by error.

In some examples, the locator notch 10 may be u-shaped. In other examples, the locator notch 10 may be v-shaped. In yet other examples, the locator notch 10 may be a straight notch. In still other examples, the locator notch 10 may be a combination of the foregoing examples (i.e. u-shaped, v-shaped or a straight notch). In practice, the locator notch 10 may be any shape as desired that is not inconsistent and incompatible with the principles of the subject matter. In some examples, the locator notch 10 may suitably be carved on at least a side of the veined end mill tool blank 2 as depicted in FIG. 1B-1D, 2B-2D, 3B-3D, or 4B-4D. In other examples, the locator notch 10 may be engraved on a top of the veined end mill tool blank 2 as shown in FIGS. 1A-4A. In some examples, the locator notch 10 may be a laser engraved, or an electrical discharge machining (EDM) notch. In other examples, the locator notch 10 may be carved by a grinding wheel.

A skilled artisan would in practice know how electrical discharge machining (EDM) is performed and operated. Electrical discharge machining (EDM) also referred to as spark machining, spark eroding, die sinking, wire burning, or wire erosion is conventionally known as a metal manufacturing process, where a desired shape is carved, engraved, inscribed, or otherwise cut on a work piece by using electrical discharges.

Material is removed from the work piece by a series of rapidly recurring current discharges between two electrodes, which are separated by a dielectric liquid and subject to an electric voltage. One of the electrodes is called the tool electrode, or simply the "tool" or the "electrode", while the other electrode is called the work piece electrode, or "Work piece". The process depends upon the notion of the tool and the work piece not making any physical contact with one another due to the separation by the dielectric liquid.

When the voltage between the two electrodes is increased, the intensity of the electric field in the volume between the electrodes is also increased causing a dielectric breakdown of the liquid and producing an electric arc. Thus, this causes a desired part of the material to be removed from the electrodes. Once the current is removed, new dielectric liquid is conveyed into the inter-electrode volume, thereby enabling the solid particle debris that has been cut from the material to be carried away and the insulating properties of the dielectric to be restored. Adding a new dielectric liquid in the inter-electrode volume is commonly referred to in the art of EDM as "flushing". After a new round of increasing the current flow, the voltage between the two electrodes is once again restored to the level it was before the dielectric breakdown of the liquid, such that a new dielectric liquid breakdown can occur to repeat the cycle all over again.

EXAMPLE

The following example is put forth so as to provide those of ordinary skill in the art with a complete disclosure and description of how to make and use the described subject matter and are not intended to limit the scope of what the inventors regard as their disclosure nor are they intended to represent that the experiments below are all or the only experiments performed. Efforts have been made to ensure accuracy with respect to numbers used but some experimental errors and deviations should be accounted for. Unless indicated otherwise, parts are by weight, molecular weight is weight average molecular weight, temperature is in degrees Centigrade, and pressure is at or near atmospheric.

Example 1

Use of the Veined End Mill Tool Blank by a Tool Fabricator

In order to use the veined end mill tool 2, a tool fabricator would first have to process the veined end mill tool blank 2 by clamping the tool blank 2 onto a collet system in a tool machine. When this is done, typically a probe or a camera is next used to locate and to determine the exact coordinates of the locator notch 10, which locator notch 10, is carved on the tool blank 2 in a relative position to the veined superabrasive material 6. As described previously, the locator notch 10 is engraved or inscribed at a known location that is relative to the actual starting point of the vein composed of the superabrasive material 6 or in its vicinity. The locator notch 10 engraved on the veined end mill tool blank indicates the precise location of the superabrasive material 6 on the tool blank 2, thereby eliminating the need for manually locating coordinates of the superabrasive material 6. Finally, by applying a computer numerical control programming (CNC) operation, this step will ultimately further process the tool blank 2 by exposing the cutting edges of the superabrasive material 6, in order to create the final geometry of the cutting tool.

Figure 1D:
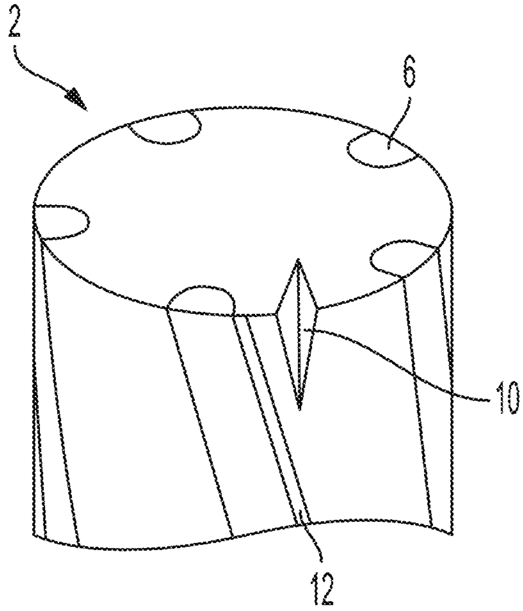
FIG. 1D shows a magnified top perspective view of the veined end mill tool blank in accordance with an exemplary embodiment of the disclosure.
Figure 2A:
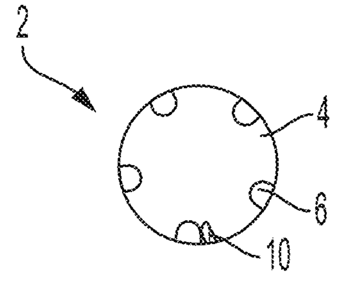
FIG. 2A shows a top view of the veined end mill tool blank in accordance with yet another exemplary embodiment of the disclosure
Figure 2B:
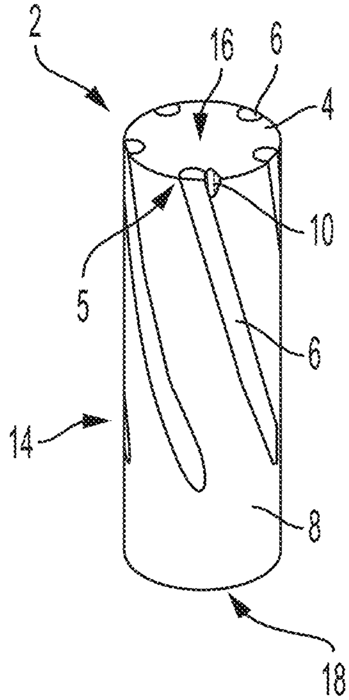
FIG. 2B shows a top perspective view of the veined end mill tool blank in accordance with yet another exemplary embodiment of the disclosure.
Figure 2C:
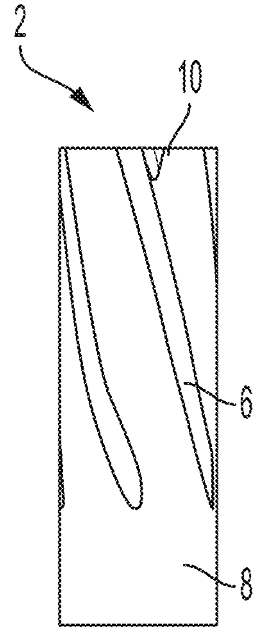
FIG. 2C shows a side view of the veined end mill tool blank in accordance with yet another exemplary embodiment of the disclosure.
Figure 2D:
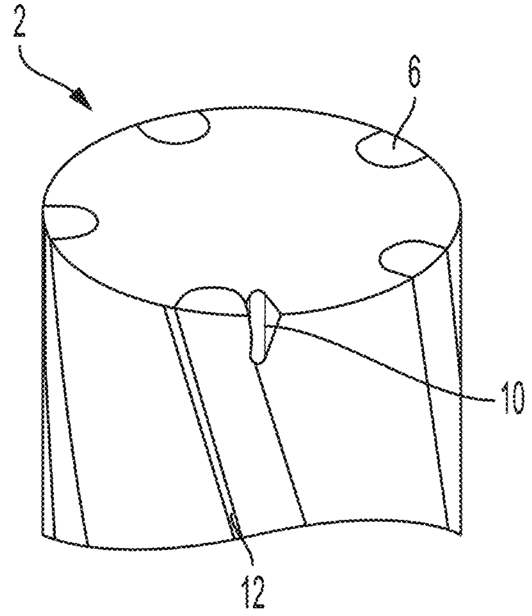
FIG. 2D shows a magnified top perspective view of the veined end mill tool blank in accordance with yet another exemplary embodiment of the disclosure.
Figure 3A:
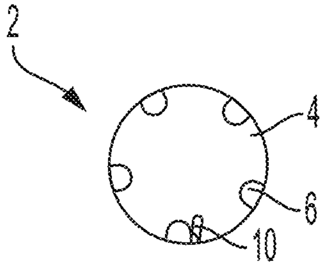
FIG. 3A shows a top view of the veined end mill tool blank in accordance with still another exemplary embodiment of the disclosure.
Figure 3B:
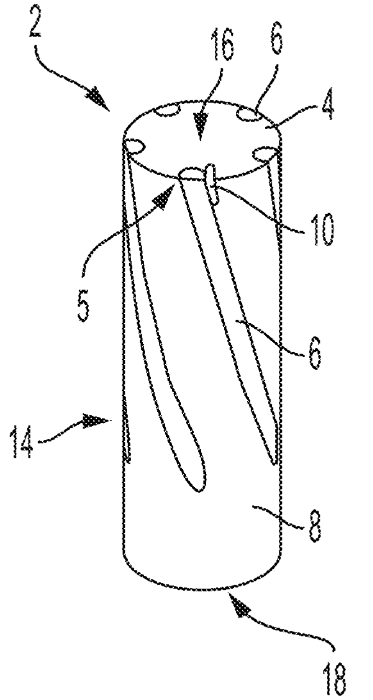
FIG. 3B shows a top perspective view of the veined end mill tool blank in accordance with still another exemplary embodiment of the disclosure.
Figure 3C:
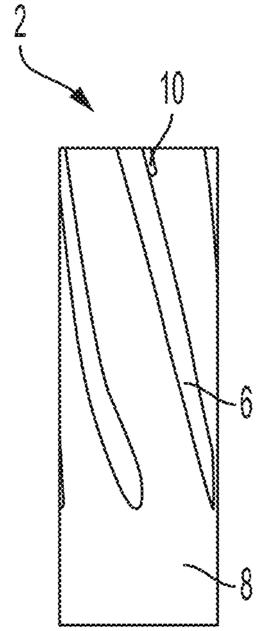
FIG. 3C shows a side view of the veined end mill tool blank in accordance with still another exemplary embodiment of the disclosure.
Figure 3D:
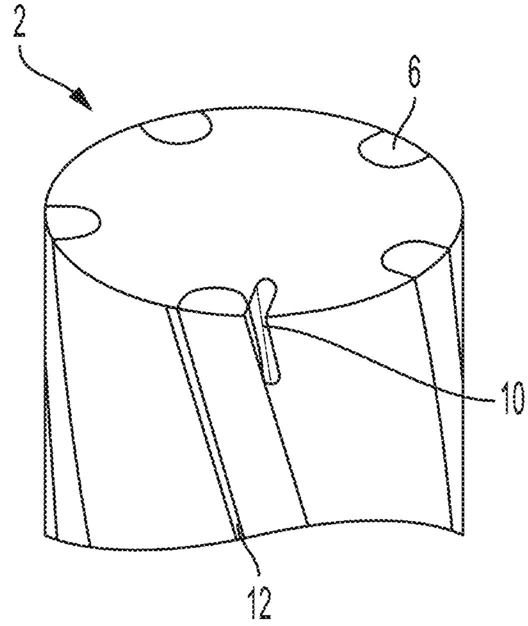
FIG. 3D shows a magnified top perspective view of the veined end mill tool blank in accordance with still another exemplary embodiment of the disclosure.
Figure 4A:
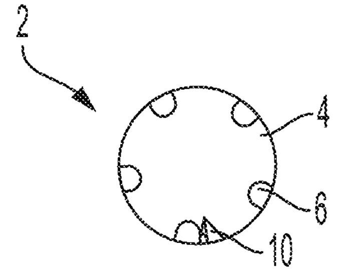
FIG. 4A shows a top view of the veined end mill tool blank in accordance with even another exemplary embodiment of the disclosure.
Figure 4B:
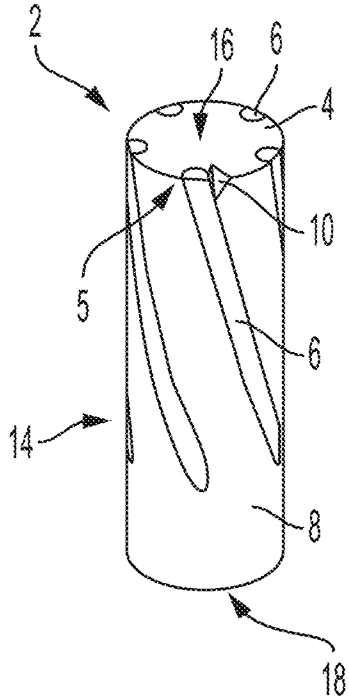
FIG. 4B shows a top perspective view of the veined end mill tool blank in accordance with even another exemplary embodiment of the disclosure.
Figure 4C:
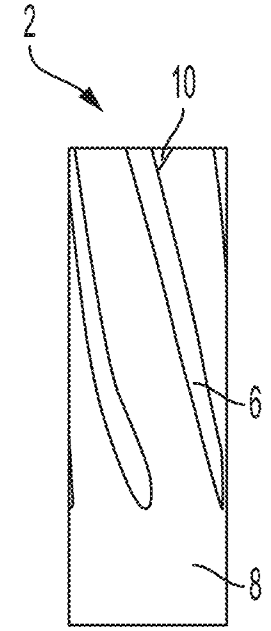
FIG. 4C shows a side view of the veined end mill tool blank in accordance with even another exemplary embodiment of the disclosure.
Figure 4D:
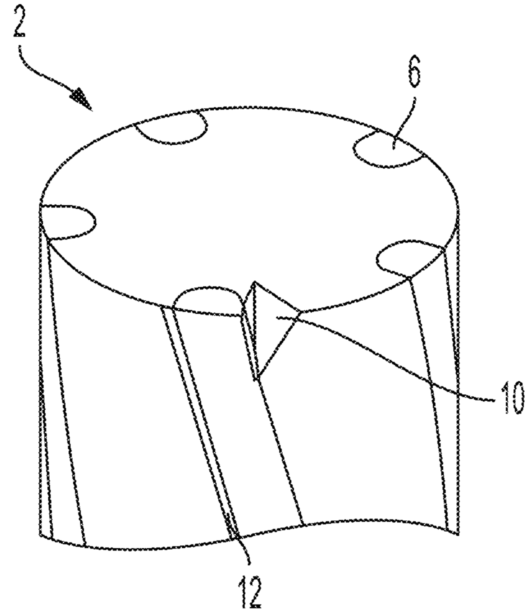
FIG. 4D shows a magnified top perspective view of the veined end mill tool blank in accordance with still another exemplary embodiment of the disclosure.

Turning now to FIGS. 1A-4A, 1B-4B, 1C-4C and 1D-4D, these figures portray different embodiments of the tool blank 2 that is carved with the locator notch 10 at different positions relative to the vein composed of the superabrasive material 6. Starting with FIGS. 1A and 1D, these figures show a top view and a magnified top perspective view, respectively, of the veined end mill tool blank 2 with the locator notch 10 carved thereon as a v-shape in accordance with an exemplary embodiment of the subject matter. As seen in FIGS. 1A and 1D, the locator notch 10 is distant from and is engraved in a relative position to the vein composed of the superabrasive material 6. On the other hand, FIGS. 2A and 2D depict a top view and a magnified top perspective view, respectively, of the veined end mill tool blank 2 with the locator notch 10 engraved thereon instead as a u-shape in accordance with yet another exemplary embodiment of the disclosure. In contrast to FIGS. 1A and 1D, the locator notch 10 in FIGS. 2A and 2D touches and is thus directly at the starting point of the vein composed of the superabrasive material 6. FIGS. 3A, 3D, 4A, and 4D illustrate a top view and a magnified top perspective view of the veined end mill tool blank 2 with the locator notch 10 inscribed thereon as a straight notch and as a v-shape, respectively, in accordance with still other exemplary embodiments of the disclosure. Besides illustrating different shapes of the locator 10, FIGS. 2A, 2D, 3A, 3D, 4A and 4D further depict locator notches 10 that are all positioned, such that they are directly abutting the vein composed of the superabrasive material 6.

Although the present disclosure has been described in connection with embodiments thereof, it will be appreciated by those skilled in the art that additions, deletions, modifications, and substitutions not specifically described may be made without departure from the spirit and scope of the disclosure as defined in the appended claims.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase “A or B” will be typically understood to include the possibilities of “A” or “B” or “A and B.”

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. The upper and lower limits of these smaller ranges which can independently be included in the smaller ranges is also encompassed within the disclosure, subject to any specifically excluded limit in the stated range. Where the stated range includes one or both of the limits, ranges excluding either both of those included limits are also included in the disclosure.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Additionally, for example any sequence(s) and/or temporal order of sequence of the system and method that are described herein this disclosure are illustrative and should not be interpreted as being restrictive in nature. Accordingly, it should be understood that the process steps may be shown and described as being in a sequence or temporal order, but they are not necessarily limited to being carried out in any particular sequence or order. For example, the steps in such processes or methods generally may be carried out in various different sequences and orders, while still falling within the scope of the present disclosure.

Finally, the discussed application publications and/or patents herein are provided solely for their disclosure prior to the filing date of the described disclosure. Nothing herein should be construed as an admission that the described disclosure is not entitled to antedate such publication by virtue of prior disclosure.

What is claimed is:

1. A veined end mill tool blank, comprising:

a body comprising at least one cutting edge;

at least one slot having a curved surface running along the body, the at least one slot comprising a sintered superabrasive material;

a substrate supporting the superabrasive material the substrate joined with the superabrasive material at an interface; and a locator notch formed on the tool blank at a position proximate to the at least one slot and the superabrasive material used as a reference point to locate the superabrasive material on the tool blank, wherein the tool blank has a length ranging from 10 mm to 100 mm.

2. The veined end mill tool blank of claim 1, wherein the tool blank has a plurality of slots.

3. The veined end mill tool blank of claim 2, wherein the tool blank has 3 to 6 slots.

4. The veined end mill tool blank of claim 1, wherein the locator notch formed on the tool blank indicates a location of the superabrasive material on the tool blank eliminating the need for manually locating coordinates of the superabrasive material in a grinder.

5. The veined end mill tool blank of claim 1, wherein the locator notch is u-shaped, v-shaped or a straight notch.

6. The veined end mill tool blank of claim 1, wherein the superabrasive material is at least one of polycrystalline diamond (PCD), polycrystalline cubic boron nitride (PcBN), cubic boron nitride (cBN), or any combinations thereof.

7. The veined end mill tool blank of claim 6, wherein the superabrasive material is polycrystalline diamond (PCD).

8. The veined end mill tool blank of claim 1, wherein the locator notch is formed with a laser or by electrical discharge machining (EDM).

9. The veined end mill tool blank of claim 1, wherein the locator notch is formed with a grinding wheel.

10. The veined end mill tool blank of claim 1, wherein the tool blank has a cylindrical shape.

11. The veined end mill tool blank of claim 1, wherein the substrate is tungsten carbide (WC).

12. The veined end mill tool blank of claim 1, wherein the locator notch is formed on a side of the tool blank.

13. The veined end mill tool blank of claim 1, wherein the locator notch is formed on a top of the tool blank.

14. The veined end mill tool blank of claim 1, wherein the tool blank has the length ranging from 10 mm to 50 mm.

15. The veined end mill tool blank of claim 1, wherein the tool blank has a vein length ranging from 3 mm to 35 mm.

16. The veined end mill tool blank of claim 15, wherein the tool blank has the vein length ranging from 10 mm to 20 mm.

17. The veined end mill tool blank of claim 1, wherein the tool blank has a diameter ranging from 5 mm to 15 mm.

18. The veined end mill tool blank of claim 17, wherein the tool blank has the diameter ranging from 10 mm to 15 mm.

19. The veined end mill tool blank of claim 1, wherein the tool blank has a helix-shaped slot comprising the superabrasive material.

20. The veined end mill tool blank of claim 19, wherein an angle of the helix-shaped slot is about 15° or about 30°.

* * * * *